(12) United States Patent
Utsunomiya et al.

(10) Patent No.: US 8,107,404 B2
(45) Date of Patent: Jan. 31, 2012

(54) WIRELESS COMMUNICATION CONTROL APPARATUS AND METHOD

(75) Inventors: Yoriko Utsunomiya, Tokyo (JP); Tetsu Nakajima, Yokohama (JP); Tomoya Tandai, Kawasaki (JP); Masahiro Takagi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/438,852

(22) PCT Filed: Dec. 18, 2008

(86) PCT No.: PCT/JP2008/073664
§ 371 (c)(1),
(2), (4) Date: Feb. 25, 2009

(87) PCT Pub. No.: WO2009/110161
PCT Pub. Date: Sep. 11, 2009

(65) Prior Publication Data
US 2011/0044257 A1      Feb. 24, 2011

(30) Foreign Application Priority Data

Mar. 5, 2008 (JP) .................. 2008-55346

(51) Int. Cl.
*H04B 7/005* (2006.01)
*H04Q 7/00* (2006.01)
(52) U.S. Cl. ....................... 370/278; 370/329
(58) Field of Classification Search ............... None
See application file for complete search history.

(56) References Cited

U.S. PATENT DOCUMENTS 7,103,022 B2 * 9/2006 Yoshino et al. ............... 370/330
7,436,811 B2 * 10/2008 Putcha et al. ................. 370/343
7,864,727 B2 * 1/2011 Inayoshi et al. .............. 370/329

(Continued)

FOREIGN PATENT DOCUMENTS

WO      2009110161      9/2009

OTHER PUBLICATIONS

IEEE P802.11 Wireless LANs, , WWiSE Proposal: High Throughput Extension to the 802.11 Standard, Aug. 2004.
IEEE P802.11n/D2.00, Draft Standard for Information Technology Telecommunications and Information Exchange Between Systems, Feb. 2007.

(Continued)

*Primary Examiner* — Hong Cho
(74) *Attorney, Agent, or Firm* — Turocy & Watson, LLP

(57) ABSTRACT

By using multiple channels at the same time to realize broadbanding of the frequency channels and suppressing increase in the waiting time before starting transmission of wireless signals, improvement of the practical throughput can be realized. A wireless communication apparatus AP1 is a wireless communication apparatus provided with a space division processing unit 40 for identifying which space area a radio wave has come from; a frequency division processing unit 30 for identifying which channel the radio wave has been carried through; a carrier sense unit 50 for judging the busy/idle state of the identified channel in the identified space area; a storage unit 60 for storing the judged busy/idle state in association with the space area and the channel; a determining unit 70 for, when a radio wave is transmitted to a first wireless communication apparatus, determining a channel to be used at the time of transmission according to the busy/idle state of each channel in the space area in which the first wireless terminal is located.

9 Claims, 12 Drawing Sheets

U.S. PATENT DOCUMENTS

| | | | |
|---|---|---|---|
| 2003/0128658 A1 | 7/2003 | Walton et al. | |
| 2005/0208956 A1* | 9/2005 | Takagi et al. | 455/464 |
| 2005/0277411 A1* | 12/2005 | Utsunomiya et al. | 455/434 |
| 2006/0192708 A1 | 8/2006 | Tandai et al. | |
| 2006/0209876 A1* | 9/2006 | Liu et al. | 370/445 |
| 2006/0286935 A1 | 12/2006 | Utsunomiya et al. | |
| 2007/0060159 A1 | 3/2007 | Utsunomiya et al. | |
| 2007/0133473 A1* | 6/2007 | Takagi et al. | 370/334 |
| 2007/0183392 A1* | 8/2007 | Tandai et al. | 370/350 |
| 2008/0069041 A1* | 3/2008 | Tandai et al. | 370/329 |

OTHER PUBLICATIONS

Unpublished U.S. Appl. No. 12/438,845, filed Feb. 25, 2009.

International Search Report dated May 20, 2009 corresponding to U.S. Appl. No. 12/438,852, filed Feb. 25, 2009.

Babichi, et al. Interference Mitigation on WLANs Using Smart Antennas. Published on Mar. 29, 2006. pp. 387-401.

International Search Report for PCT/JP2008/073664 Mailed May 20, 2009.

* cited by examiner

| SPACE AREA \ CHANNEL | Ch.1 | Ch.2 |
|---|---|---|
| $S_{STA1}$ | IDLE | IDLE |
| $S_{STA2}$ | IDLE | BUSY |
| $S_{STA3}$ | IDLE | IDLE |

| SPACE AREA \ CHANNEL | Ch.1 | Ch.2 | Ch.3 |
|---|---|---|---|
| $S_{STA1}$ | IDLE | IDLE | IDLE |
| $S_{STA2}$ | IDLE | BUSY | BUSY |
| $S_{STA3}$ | IDLE | IDLE | IDLE |
| $S_{STA4}$ | IDLE | BUSY | IDLE |

FIG. 11

WIRELESS COMMUNICATION CONTROL APPARATUS AND METHOD

TECHNICAL FIELD

The present invention relates to a wireless communication apparatus, a wireless communication apparatus control method and a computer readable storage medium.

BACKGROUND ART

Recently, wireless LANs (Local Area Networks) have been used in offices and homes and for hot spot services and the like in public places and have been rapidly spreading. The mainstream of the current wireless LAN standards is IEEE802.11a using 5 GHz band and IEEE802.11b/g using 2.4 GHz band. Furthermore, IEEE802.11e in which the MAC (Medium Access Control) layer stipulated in IEEE802.11a/b/g is extended and the QoS (Quality of Service) function is added has also been established as a standard. Thus, wireless LAN standardization activities are actively promoted.

Currently, standardization activities for IEEE802.11n for extending the physical/MAC layers, aiming at practically achieving throughput above 100 Mbps are conducted, and furthermore, examination of GigaLAN aiming at realization of a transmission rate of G (Giga) bps has been started.

As one of approaches for improving throughput, IEEE802.11n proposes a method in which multiple frequency channels are used at the same time to transmit wireless signals (for example, Non-patent Document 1: IEEE802.11n Working Group, "Draft Amendment to STANDARD [FOR] Information Technology-Telecommunications and information exchange between systems—Local and Metropolitan networks—Specific requirements—Part 11: Wireless LAN Medium Access Control and Physical Layer specifications: Enhancements for Higher Throughput," IEEE P802.11n™/D1.06, November 2006).

Non-patent Document 1 described above, therein disclosed a technique in which two frequency channels with a bandwidth of 20 MHz used in an IEEE802.11 wireless LAN are used at the same time to realize wireless communication with a bandwidth of 40 MHz.

When multiple frequency channels are used at the same time to transmit wireless signals, such as in the case where the frequency channel used by an own BSS (Basic Service Set) and the frequency channel used by an OBSS (Overlapping Basic Service Set) overlap with each other, the wireless signals cannot be transmitted with the use of the multiple frequency channels unless it is confirmed that the carrier sense results of all the frequency channels to be used are "idle". Therefore, for example, in the case where any of the multiple frequency channels to be used is busy, the wireless base station has to wait until all the frequency channels to be used become idle. Even if broadbanding of frequency channels is realized by using multiple frequency channels at the same time to transmit wireless signals, there is a problem that the waiting time before starting transmission of the wireless signals is increased, and the practical throughput decreases.

In addition to Non-patent Document 1 described above, there is also disclosed a technique in which carrier sense is performed for multiple frequency channels before transmission of wireless signals, and the wireless signals are transmitted with the use of only frequency channels recognized to be idle, as one of techniques for transmitting wireless signals using multiple frequency channels at the same time to improve throughput (for example, Non-patent Document 2: WWiSE, "WWISE Proposal: High throughput extension to the 802.11 Standard," WWiSE Draft, August 2004).

Non-patent Document 2 described above has the following problem. Though the waiting time before starting transmission of the wireless signals does not increase, the number of frequency channels used at the same time to transmit the wireless signals decreases and the bandwidth of the frequency channels may be narrow because frequency channels recognized to be busy as a result of the carrier sense performed just before the transmission are not used. Therefore, it is difficult to improve the practical throughput.

DISCLOSURE OF THE INVENTION

Problems to be Solved by the Invention

As described above, Non-patent document 1 has the following problem. Even if broadbanding of frequency channels is realized by using multiple frequency channels at the same time to transmit wireless signals, the waiting time before starting transmission of the wireless signals increases, and the practical throughput decreases.

Non-patent Document 2 has the following problem. Though the waiting time before starting transmission of the wireless signals does not increase, the number of frequency channels used at the same time to transmit the wireless signals decreases and the bandwidth of the frequency channels may be narrow because frequency channels recognized to be busy as a result of the carrier sense performed just before the transmission are not used. Therefore, it is difficult to improve the practical throughput.

Furthermore, it is expected that, in the examination of GigaLAN aiming at improvement of throughput beyond IEEE802.11n, a multi-channel wireless communication technique using three or more frequency channels at the same time will appear in the future.

Thus, as the number of frequency channels used at the same time to transmit wireless signals increases, the waiting time before starting transmission of the wireless signals described in Non-patent Document 1 increases, and the problem of decrease in the practical throughput becomes more serious. As for Non-patent Document 2 also, the frequency channels to be used are easily overlapped as the number of frequency channels used by an own BSS and an OBSS increases, and it is thought that the frequency channels recognized to be busy as a result of the carrier sense performed just before transmission will increase.

The present invention has been made to solve the problems of the prior-art techniques, and its object is to provide a wireless communication apparatus capable of realizing improvement of the practical throughput by using multiple frequency channels at the same time to realize broadbanding of the frequency channels and suppressing increase in the waiting time before starting transmission of wireless signals, a wireless communication control method and a computer readable storage medium.

Means for Solving the Problems

According to one aspect of the present invention, there is provided a wireless communication apparatus comprising:
a first identifying unit configured to identify a space area from which a radio wave has come;
a second identifying unit configured to identify a frequency channel through which the radio wave has been carried;

a judging unit configured to judge a busy/idle state of the frequency channel identified by the second identifying unit in the space area identified by the first identifying unit;

a storage unit configured to store the busy/idle state judged by the judging unit in association with the space area and the frequency channel;

a determining unit configured to determine one or more frequency channels to be used for transmission depending upon the busy/idle state of each frequency channel in the space area in which the first wireless communication apparatus is located; and a transmitting unit configured to transmit a radio wave through the frequency channels determined by the determining unit.

According to one aspect of the present invention, there is provided a wireless communication apparatus comprising:

a first identifying unit configured to identify a space area from which a radio wave has come;

a second identifying unit configured to identify a frequency channel through which the radio wave has been carried; and a judging unit configured to judge a busy/idle state of the frequency channel identified by the second identifying unit in the space area identified by the first identifying unit; wherein frames are transmitted according to the busy/idle state judged by the judging unit.

According to one aspect of the present invention, there is provided a wireless communication apparatus control method comprising:

identifying a space area from which a radio wave has come;

identifying a frequency channel through which the radio wave has been carried;

judging the busy/idle state of the identified frequency channel in the identified space area;

writing the judged busy/idle state into a storage unit in association with the space area and the frequency channel;

determining one or more frequency channels to be used for transmission depending upon the busy/idle state of each frequency channel in the space area in which the first wireless communication apparatus is located; and transmitting a radio wave through the determined frequency channels.

According to one aspect of the present invention, there is provided a computer-readable storage medium storing a wireless communication apparatus control program which causes a computer to realize:

a first identifying function of identifying a space area from which a radio wave has come;

a second identifying function of identifying a frequency channel through which the radio wave has been carried;

a judging function of judging the busy/idle state of the frequency channel identified by the second identifying function in the space area identified by the first identifying function;

a function of writing the judged busy/idle state judged by the judging function into a storage unit in association with the space area and the frequency channel;

a determining function of determining one or more frequency channels to be used for transmission depending upon the busy/idle state of each frequency channel in the space area in which the first wireless communication apparatus is located; and a function of transmitting a radio wave through the frequency channels determined by the determining function.

Advantage of the Invention

According to the present invention, multiple frequency channels are used at the same time to realize broadbanding of the frequency channels, and increase in the waiting time before starting transmission of wireless signals is suppressed. Thereby, improvement of the practical throughput can be realized.

BRIEF DESCRIPTION OF DRAWINGS

FIG. 11 is a block diagram showing an example of the contents stored in a channel state storage section 60 according to the second embodiment of the present invention;

BEST MODE FOR CARRYING OUT THE INVENTION

Embodiments of the present invention will be described below.

First Embodiment

Figure 1:
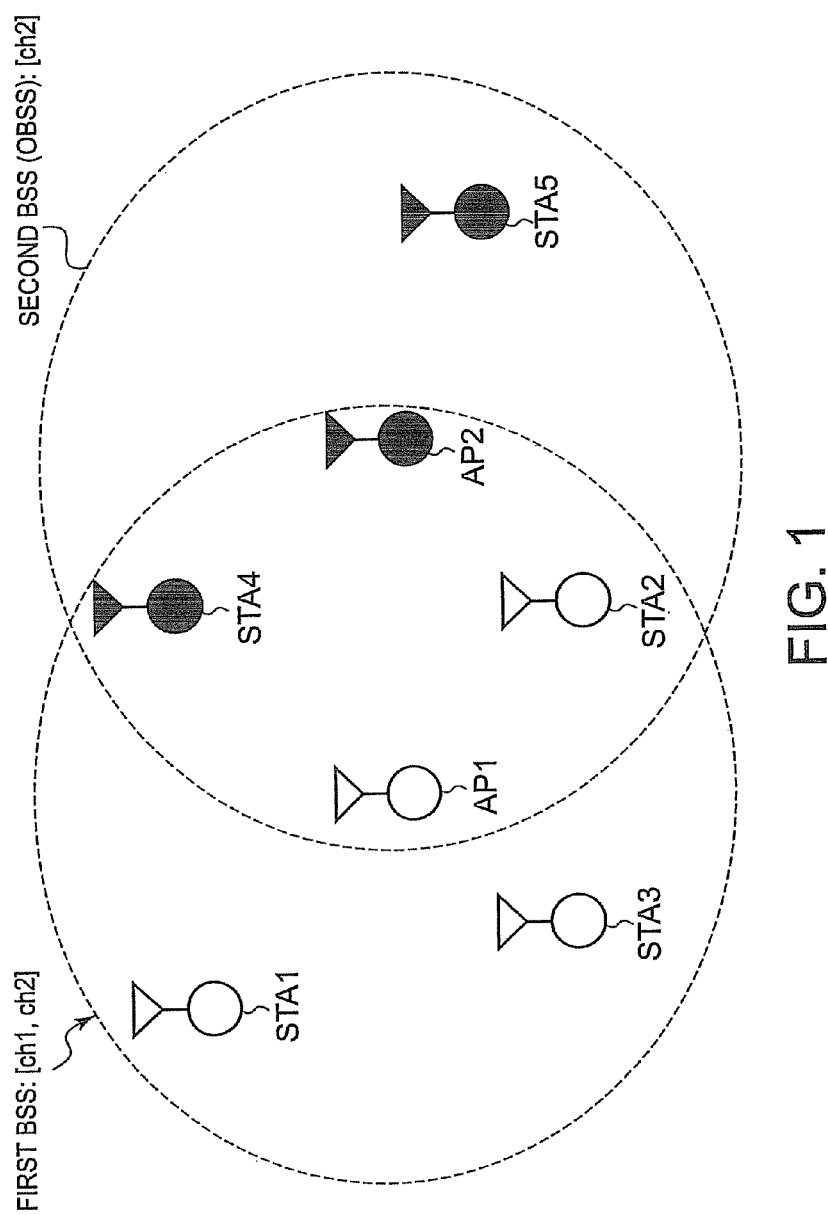
FIG. 1 is a block diagram showing a wireless system according to a first embodiment of the present invention.

FIG. 1 is a diagram showing a wireless system according to a first embodiment. An access point AP1 and wireless terminals STA1 to STA3 which belong to a first BSS are shown by marks in white, and an access point AP2 and wireless terminals STA4 and STA5 which belong to a second BSS are shown by marks in black. In the description below, a frequency channel will be referred to as a channel being shortened.

The wireless system according to the first embodiment is provided with the first BSS and the second BSS. The first BSS and the second BSS adjoin each other, and the second BSS is an OBSS for the first BSS.

The first BSS is formed by one access point AP1 and three wireless terminals STA1 to STA3. The access point AP1 intensively manages the first BSS. The wireless terminals STA1 to STA3 communicate with one another via the access point AP1.

The access point AP1 and the wireless terminals STA1 to STA3 which belong to the first BSS perform transmission/receiving of frames using one of a first channel ch1 and a second channel ch2 or using the two channels at the same time.

The access point AP1 performs transmission of directional radio waves and transmission of nondirectional radio waves. The wireless terminals STA1 to STA3 perform transmission of directional radio waves and transmission of nondirectional radio waves.

The second BSS is formed by one access point AP2 and two wireless terminals STA4 and STA5. The access point AP2 intensively manages the second BSS. The wireless terminals STA4 and STA5 communicate with each other via the access point AP2.

The access point AP2 and the wireless terminal STA4 and STA5 which belong to the second BSS perform transmission/receiving of frames using the second channel ch2.

The access point AP2 and the wireless terminals STA4 and STA5 may be able to perform transmission of directional radio waves and transmission of nondirectional radio waves or may be able to perform only transmission of nondirectional radio waves.

The first BSS and the second BSS are overlapped with each other in the second channel ch2. Therefore, the access point AP1 and the wireless terminals STA1 to STA3 which belong to the first BSS, and the access point AP2 and the wireless terminals STA4 and STA5 which belong to the second BSS share the same channel (the second channel ch2).

In the first embodiment, description is made on the assumption that the first BSS uses one channel or uses two channels at the same time. However, the number of channels which can be used at the same time for transmission/receiving of frames is not limited.

Figure 2:
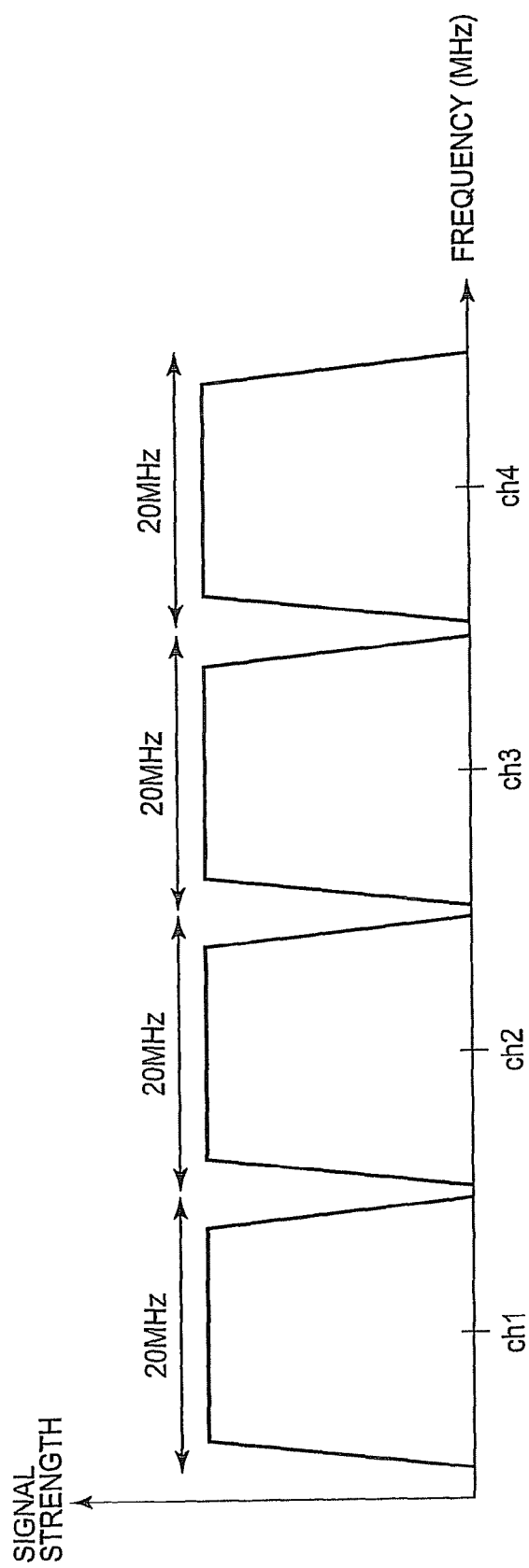
FIG. 2 is a schematic diagram of channels according to the first embodiment of the present invention.

FIG. 2 is a schematic diagram showing an example of arrangement of channels. In the frequency band shown in FIG. 2, there are four channels with a bandwidth of 20 MHz. The channels with a bandwidth of 20 MHz shown in FIG. 2 are indicated by a first channel ch1, a second channel ch2, a third channel ch3 and a fourth channel ch4, respectively.

Figure 3:
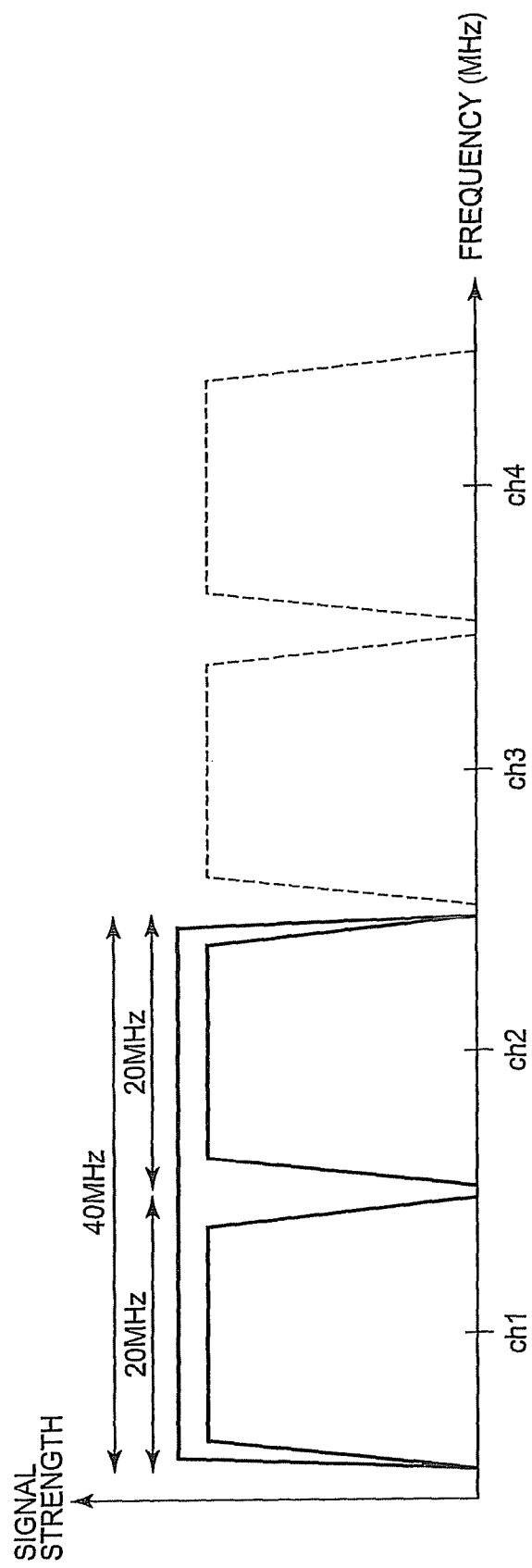
FIG. 3 is a diagram showing an example of use of the channels according to the first embodiment of the present invention.

FIG. 3 is a schematic diagram showing the channels used by the first BSS in the frequency band shown in FIG. 2.

In the first BSS, wireless communication with a bandwidth of 20 MHz may be performed with the use of only the first channel ch1 between AP and STA or between STA and STA. Wireless communication with a bandwidth of 20 MHz may be performed with the use of only the second channel ch2. Wireless communication with a bandwidth of 40 MHz may be performed by using the first channel ch1 and the second channel ch2 at the same time. It is also possible to determine a channel to be used for wireless communication with a bandwidth of 20 MHz in the first BSS to use any one of the first channel ch1 and the second channel ch2.

In the second BSS, wireless communication with a bandwidth of 20 MHz is performed with the use of only the second channel ch2 between AP and STA or between STA and STA.

The first channel ch1 and the second channel ch2 may be used by other wireless systems or other BSS's. Especially, other wireless systems and other BSS's in conformity with the IEEE802.11/a/b/g standard may use a channel with a bandwidth of 20 MHz (for example, the first to fourth channels).

Figure 4:
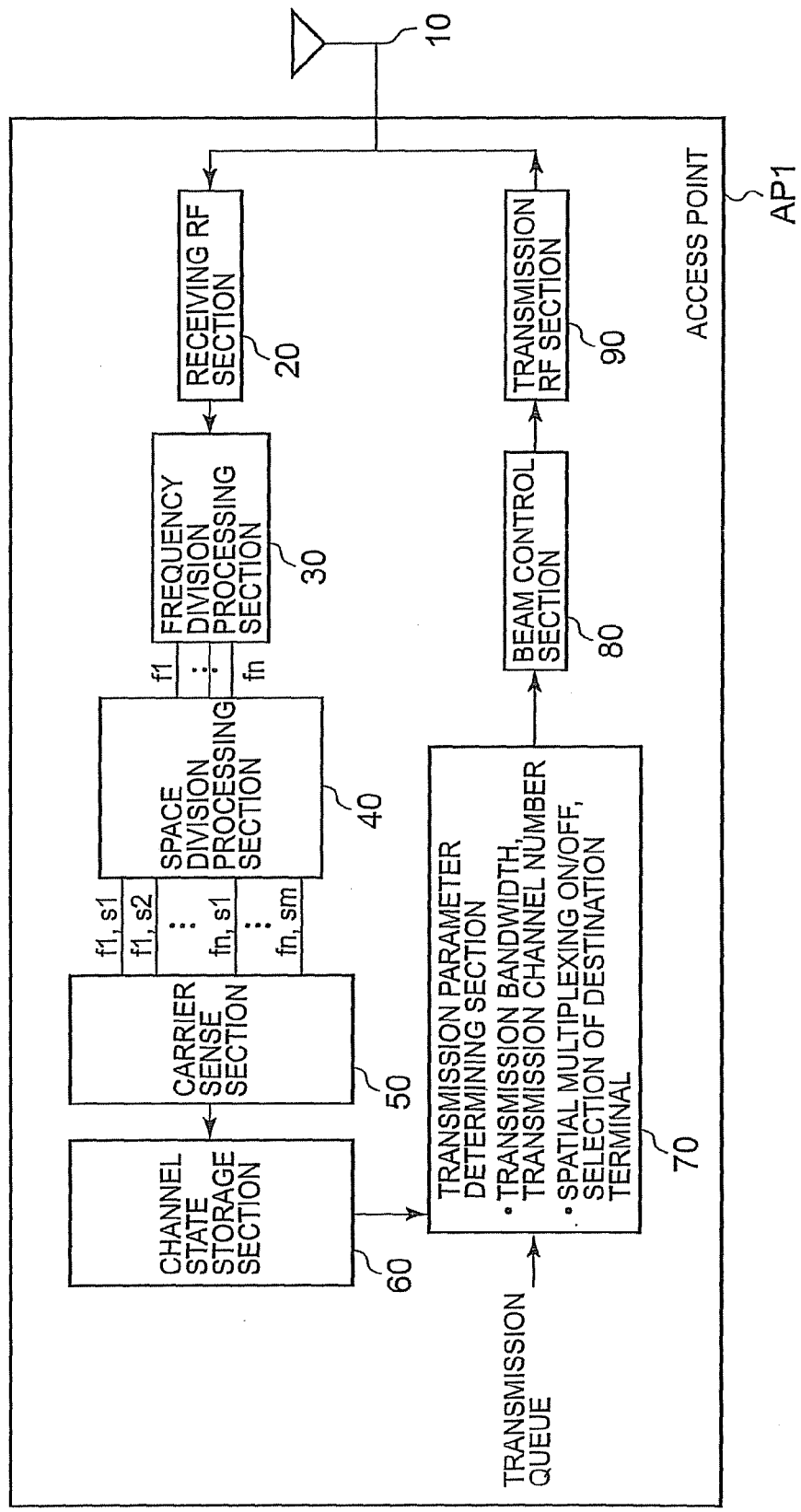
FIG. 4 is a block diagram showing the configuration of an access point according to the first embodiment of the present invention.

FIG. 4 is a block diagram showing the configuration of the access point AP1. The configurations of the wireless terminals STA1, STA2 and STA3 are similar to the configuration.

The access point AP1 has an antenna 10, a receiving RF (Radio Frequency) section 20, a frequency division processing section 30, a space division processing section 40, a carrier sense section 50, a channel state storage section 60, a transmission parameter determining section 70, a beam control section 80, and a transmission RF section 90.

First, description will be made on the configuration requirements of the access point AP1 as well as on the operation performed when the access point AP1 receives frames.

A radio wave received by the antenna 10 is inputted into the receiving RF section 20 as a wireless signal.

The receiving RF section 20 performs RF processing, such as frequency conversion processing, of the wireless signal. The receiving RF section 20 outputs the wireless signal after the RF processing, to the frequency division processing section 30.

The frequency division processing section 30 identifies the channel through which the radio wave received by the antenna 10 has been carried. The frequency division processing section 30 identifies, for example, the 5 GHz band as any of the first channel ch1 and the second channel ch2 as shown in FIG. 3. The frequency division processing section 30 outputs a wireless signal carried through the first channel ch1 as a signal "f1", ... and outputs a wireless signal carried through the n-th channel chn as a signal "fn".

The frequency division processing section 30 may wait for a wireless signal from a particular channel (that is, one of the first channel ch1 and the second channel ch2) and switch the channel for waiting for a wireless signal at constant time intervals.

The frequency division processing section 30 may wait for a wireless signal from all the channels (that is, both of the first channel ch1 and the second channel ch2) and, when a wireless signal is inputted, notify at which channel power has been detected, to the carrier sense section 50.

The space division processing section 40 identifies which space area among a first space area to an m-th space area (m: integer equal to or more than 2) the radio wave received by the antenna 10 has come from. A space area is a unit for judging the idle/busy state, and it is a region from which a radio wave received by the antenna 10 has come.

As for an inputted signal "f1", the space division processing section 40 outputs a signal component by a radio wave which has come from the first space area, as a signal "f1, s1", ..., and outputs a signal component by a radio wave which has come from the m-th space area as a signal "f1, sm". Similarly, as for inputted signals "f2" to "fn" also, the space division processing section 40 outputs signal components as a signal "f2, s1" to a signal "f2, sm", ..., a signal "fn, s1" to a signal "fn, sm" according to which space area the signal-component-carrying radio wave has come from.

The space division processing section 40 may estimate the direction (space area) from which the radio wave received by the antenna 10 has come and notify the direction (space area) to the carrier sense section 50.

Furthermore, the space division processing section 40 may hold position information about the wireless terminals STA1 to STA3 which belong to the first BSS in advance, acquires the direction (space area) from which the radio wave received by the antenna 10 has come, from the position information about the wireless terminal which has transmitted the radio wave, and notify the direction (space area) to the carrier sense section 50.

Furthermore, if the antenna 10 is a sector antenna, the space division processing section 40 may notify information about the sector (space area) which has received the radio wave, to the carrier sense section 50.

In the above (FIG. 4), it has been described that a wireless signal received by the antenna 10 is processed by the space division processing section 40 after being processed by the frequency division processing section 30. However, the wireless signal may be processed by the frequency division processing section 30 after being processed by the space division processing section 40.

In the above (FIG. 4), it has been described that, after processing by one of the frequency division processing section 30 and the space division processing section 40 is performed, processing by the other is performed (serial processing). However, the processings by the frequency division processing section 30 and the space division processing section 40 may be performed at the same time (parallel processing).

The carrier sense section 50 judges the idle/busy state of each channel in each space area. The carrier sense section 50 compares the received signal strength of each of the inputted signals "f1, s1" ... "fn, sm" with a threshold. The carrier sense section 50 judges "busy" if the received signal strength is larger than the threshold, and judges "idle" if the received signal strength is smaller than the threshold. The carrier sense section 50 writes the judgment result about the idle/busy state of each channel in each space area into the channel state storage section 60.

The carrier sense section 50 may judge, for each of the inputted signals "f1, s1" ... "fn, sm", the busy/idle state by comparing an average value of the received signal strengths for a certain period of time with the threshold in order to avoid misreading a short-time noise as a wireless signal.

The threshold used for the carrier sense section 50 to judge the busy/idle state may be a fixed value. It may be set by a processing section for performing processing related to the MAC layer according to the interference occurrence condition, or may be selected among multiple preset values.

Furthermore, the carrier sense section 50 may receive a wireless signal in the notified channel and space area together with the information about the channel notified from the frequency division processing section 30 and the information about the space area notified from the space division processing section 40. In this case, the carrier sense section 50 compares the received signal strength of the wireless signal it has received, with the threshold and judges the busy/idle state of the notified channel and space area.

Furthermore, the carrier sense section 50 may judge the busy/idle state of each channel in each space area by the busy/idle state judged at the physical layer as described above and the busy/idle state (virtual carrier sense information) judged by a protocol of the MAC layer (for example, NAV (Network Allocation Vector)). In this case, if at least any one of the busy/idle state judged at the physical layer and the busy/idle state judged by the protocol of the MAC layer is "busy", then the carrier sense section 50 judges "busy". If both judgment results are "idle", then the space division processing section 40 judges "idle".

Figures 5, 6:
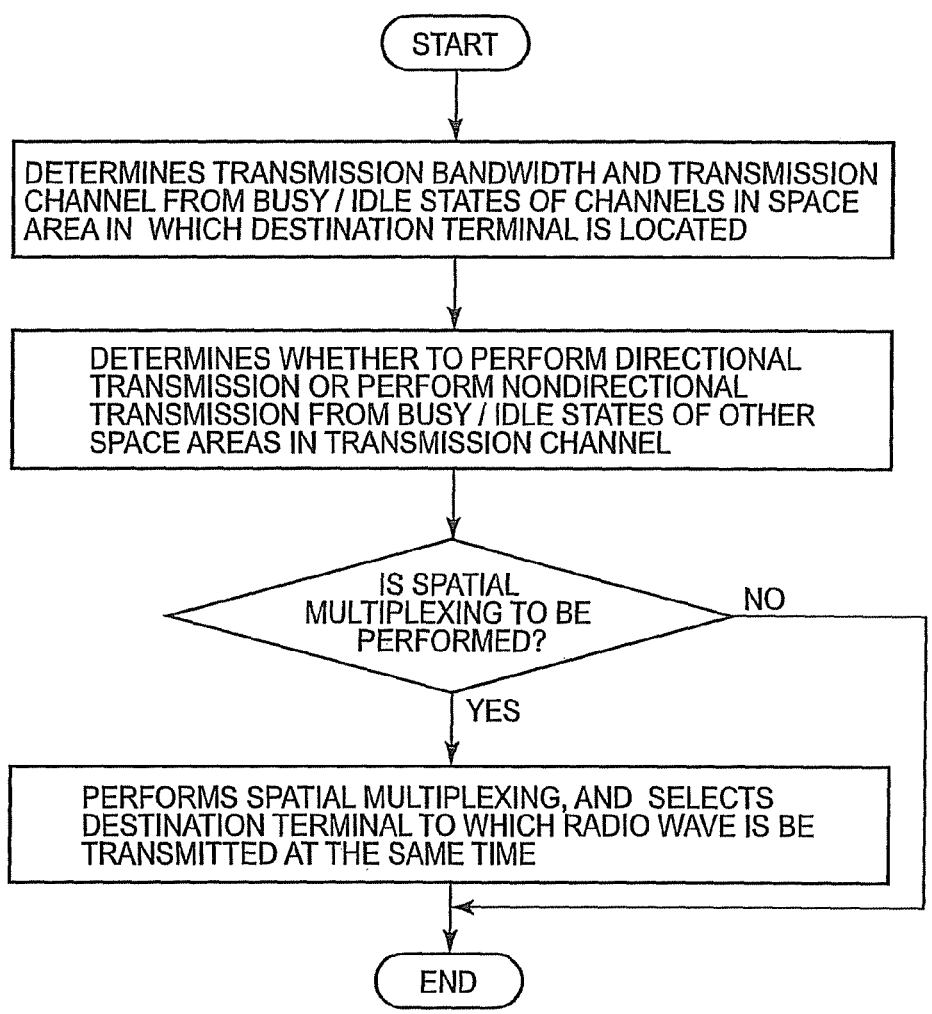
FIG. 5 is a block diagram showing an example of the contents stored in a channel state storage section 60 according to the first embodiment of the present invention.
FIG. 6 is a flowchart showing the operation of the access point according to the first embodiment of the present invention.

FIG. 5 is a diagram showing an example of the contents stored in the channel state storage section 60.

The channel state storage section 60 stores the idle/busy state of each channel in each space area. The space areas $S_{STA1}$, $S_{STA2}$ and $S_{STA3}$ are space areas where the wireless terminals STA1 to STA3 which belong to the same first BSS as the access point AP1 are located, respectively. The channels are the first channel ch1 and the second channel ch2 used by the access point AP1 for wireless communication.

The directions (space areas) from which radio waves transmitted from the wireless terminals STA1 to STA3 have come are indicated by $S_{STA1}$, $S_{STA2}$ and $S_{STA3}$, respectively. The range of the space area $S_{STA1}$ is determined by the performance of the antenna 10. For example, the range is assumed to be the range of ±15 degrees with the direction from which the radio wave transmitted from the wireless terminal STA1 has come as the center.

If the antenna 10 is a sector antenna, the sector numbers (space areas) of the sectors which receive radio waves from the wireless terminal STA1 to STA 3 may be used instead of $S_{STA1}$, $S_{STA2}$ and $S_{STA3}$ in FIG. 5, respectively. The range of the space area specified by a sector number is determined by the performance of the antenna 10. For example, the range is assumed to be the range of 45 degrees which is obtained by dividing 360 degrees into equal eight parts.

FIG. 5 shows that, as for the directions in which the wireless terminals STA1 and STA3 are located (the space areas $S_{STA1}$ and $S_{STA3}$), both of the first channel ch1 and the second channel ch2 are idle. FIG. 5 shows that, as for the direction in which the wireless terminal STA2 is located (the space area $S_{STA2}$), the first channel ch1 is idle and the second channel ch2 is busy.

For example, if judging "channel=first channel ch1; space area=$S_{STA1}$; busy/idle state=idle", the carrier sense section 50 writes "idle" as the busy/idle state in the field specified by the column ch1 and the line $S_{STA1}$.

For example, if judging "channel=second channel ch2; space area=$S_{STA2}$; busy/idle state=busy", the carrier sense section 50 writes "busy" as the busy/idle state in the field specified by the column ch2 and the line $S_{STA2}$.

The contents stored in the channel state storage section 60, that is, the busy/idle state of each channel in each space area may be updated by performing carrier sense at the time of transmitting frames or updated periodically.

Furthermore, the carrier sense section 50 may not only judge the busy/idle state by comparing the received signal strength of a received wireless signal and a threshold but also judge the busy/idle state according to the busy/idle state of each of the wireless terminals STA 1 to STA 3 notified by each of them.

Next, description will be made on the configuration requirements of the access point AP1 as well as on the operation performed when the access point AP1 transmits frames.

An upper layer processing section (not shown) stores data (frames) to be transmitted into a transmission queue. The frames stored in the transmission queue are outputted to the transmission parameter determining section 70 in the order of being stored into the transmission queue.

The transmission parameter determining section 70 reads the busy/idle state of each channel in each space area stored in the channel state storage section 60. The transmission parameter determining section 70 determines transmission parameters used to transmit the inputted frames, according to the busy/idle state of each channel in each space area.

Example 1

FIG. 6 is a flowchart showing the operation performed at the time of the transmission parameter determining section 70 determining transmission parameters when the access point AP1 transmits frames to the wireless terminal STA1. The transmission parameters includes information indicating a transmission bandwidth, information indicating a transmission channel, information indicating which of directional transmission and nondirectional transmission is to be performed, information indicating whether spatial multiplexing is to be performed, and information indicating a wireless terminal for which spatial multiplexing is to be performed. The transmission parameters may be a part of the above five pieces of information, and it may include information other than the five.

First, the transmission parameter determining section 70 determines a transmission bandwidth and a transmission channel from the busy/idle states of the channels in the space area $S_{STA1}$ where the wireless terminal STA1 which is the destination of frames (the destination terminal) is located (step S101).

The transmission parameter determining section 70 determines all of channels the busy/idle states of which are "idle", among the channels in the space area in which the destination terminal is located, as channels to be used at the same time for transmission of the frames (transmission channels).

Since the busy/idle states of the first channel ch1 and the second channel ch2 are "idle" in the space area STA1 in which the destination terminal (the wireless terminal STA1) is located, the transmission parameter determining section 70 determines that the two channels of the first channel ch1 and the second channel ch2 are to be used at the same time. In this case, the transmission parameter determining section 70 determines "40 MHz" as the transmission bandwidth and "ch1 and ch2" as the transmission channels.

The transmission parameter determining section 70 may determine the transmission bandwidth and the transmission channel to be used for transmission of frames according to the type of the application of the frames to be transmitted. The type of the application of frames is, for example, the type of the information included in the frames, and it is information indicating which of video information, voice information and information related to data communication (file exchange) the information included in the frames is. The type of the application of the frames stored in the transmission queue is stored for each frame in a storage section (not shown) different from the transmission queue. If the type of the application of the frames to be transmitted is video information or information related to data communication, then the transmission parameter determining section 70 determines all of the channels the busy/idle states of which are "idle", among the channels in the space area in which the destination terminal is located, as the channels to be used at the same time for transmission of the frames. On the other hand, if the type of the application of the frames to be transmitted is voice information, then the transmission parameter determining section 70 determines any one of the channels the busy/idle states of which are "idle", among the channels in the space area in which the destination terminal is located, as the channel to be used for transmission of the frames. Thereby, it is possible to decrease delay caused at the time of transmitting voice information and increase the bandwidth at the time of transmitting video information or information related to data communication.

When selecting one of multiple channels the busy/idle states of which are "idle", among the channels in the space area in which the destination terminal is located, the transmission parameter determining section 70 preferentially selects such a channel that the adjoining areas are idle. For example, when selecting one channel to be used for transmission of frames, the transmission parameter determining section 70 selects, between the first and second channels ch1 and ch2 in the space area $S_{STA1}$ the busy/idle state of which is "idle", not the second channel ch2 where the busy/idle state of the adjoining space area $S_{STA2}$ is "busy" but the first channel ch1 where the busy/idle states of the adjoining space areas $S_{STA2}$ and $S_{STA3}$ are "idle". Thereby, it is possible to prevent occurrence of interference of a radio wave to be transmitted.

Next, the transmission parameter determining section 70 determines whether to transmit a directional radio wave (directional transmission) or transmit a nondirectional radio wave (nondirectional transmission), from the busy/idle states of the other space areas ($S_{STA2}$ and $S_{STA3}$) in the transmission channels determined at step S101 (the first and second channels ch1 and ch2) (step S102).

The transmission parameter determining section 70 determines to perform nondirectional transmission if all the busy/idle states of the space areas ($S_{STA2}$ and $S_{STA3}$) other than the space area ($S_{STA1}$) in which the destination terminal (the wireless terminal STA1) is located are "idle" and to perform directional transmission if at least one is "busy". Thereby, it is possible to improve the throughput.

Since, in the transmission channels (the first channel ch1 and the second channel ch2), the busy/idle state of the second channel ch2 in the space area $S_{STA2}$, between the space areas ($S_{STA2}$ and $S_{STA3}$) other than the space area ($S_{STA1}$) in which the destination terminal (the wireless terminal STA1) is located, is "busy" at step 102, the transmission parameter determining section 70 determines to perform directional transmission.

The transmission parameter determining section 70 may determine to perform directional transmission in a transmission channel irrespective of the busy/idle states of the space areas ($S_{STA2}$ and $S_{STA3}$) other than the space area ($S_{STA1}$) in which the destination terminal (the wireless terminal STA1) is located. Thereby, it is possible to suppress occurrence of conflict with a radio wave (frames) transmitted by the OBSS (the second BSS) or the like.

Next, the transmission parameter determining section 70 determines whether or not to perform spatial multiplexing, that is, whether or not to transmit radio waves to multiple terminals using the same channel at the same time (step S103).

The transmission parameter determining section 70 determines to perform spatial multiplexing when it is sufficiently possible to perform directional transmission of radio waves to wireless terminals other than the destination terminal (the wireless terminal STA1) according to the ability of the access point AP1 (such as the number of antennas).

It is assumed that, at step S103, the transmission parameter determining section 70 determines to transmit to radio waves to the wireless terminals other than the destination terminal and perform spatial multiplexing.

The transmission parameter determining section 70 may determine whether or not to perform spatial multiplexing depending on whether there exists any frame destined to a wireless terminal other than the destination terminal (the wireless terminal STA1) among the frames stored in the transmission queue.

Furthermore, the transmission parameter determining section 70 may compare the magnitude of the throughput required for transmission of frames to the destination terminal (the wireless terminal STA1) with a threshold, and determine not to perform spatial multiplexing if the required throughput is larger than the threshold and to perform spatial multiplexing if the required throughput is smaller than the threshold.

Next, if determining to perform spatial multiplexing at step S103 (step S103:YES), the transmission parameter determining section 70 performs spatial multiplexing and selects wireless terminals to which radio waves are transmitted at the same time (wireless terminals for which spatial multiplexing is performed) (step S104).

The transmission parameter determining section 70 selects the wireless terminals STA1 and STA3, for which both of the first and second channels ch1 and ch2 are idle, as the wireless terminals for which spatial multiplexing is performed. In this case, the access point AP1 transmits the frames destined to the wireless terminal STA1 and the frames destined to the wireless terminal STA3, which are stored in the transmission queue, at the same time via the first and second channels ch1 and ch2 by spatial multiplexing.

The transmission parameter determining section 70 may select wireless terminals for which spatial multiplexing is to be performed in a manner that the correlation of radio waves transmitted at the same time is small and spatial separation can be easily performed, in accordance with the channel information acquired when the physical-layer-related processing was performed.

Furthermore, the transmission parameter determining section 70 may select such wireless terminals that the traffic classes of the frames stored in the transmission queue are the same, as the wireless terminals for which spatial multiplexing is to be performed.

Furthermore, the transmission parameter determining section 70 may select such wireless terminals that the frame lengths of the frames stored in the transmission queue resemble, as the wireless terminal for which spatial multiplexing is to be performed.

In this way, the transmission parameter determining section 70 determines transmission parameters used to transmit inputted frames, according to the busy/idle state of each channel in each space area.

The beam control section 80 forms radio waves (beams) to be transmitted in accordance with the transmission parameters determined by the transmission parameter determining section 70 and controls the antenna 10.

The beam control section 80 uses the first and second channels ch1 and ch2 to form beams in a manner that the directivity of the beams is oriented to the wireless terminals STA1 and STA3. The beam control section 80 may form the beams so that null is oriented to the space area $S_{STA2}$ when directional transmission of the beams is performed to the space areas $S_{STA1}$ and $S_{STA3}$ via the first and second channels ch1 and ch2.

Figure 7:
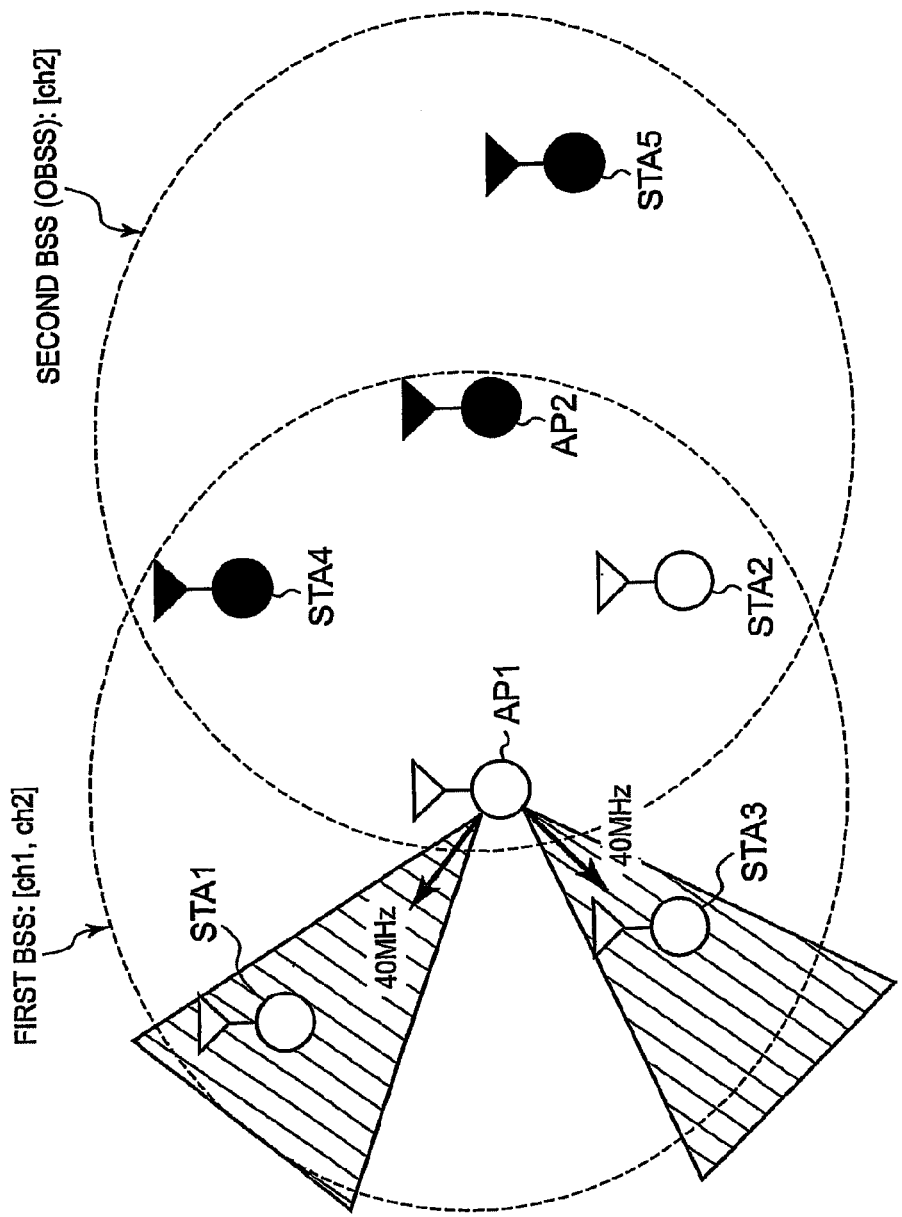
FIG. 7 is a schematic diagram showing radio waves transmitted from the access point according to the first embodiment of the present invention.

FIG. 7 is a diagram showing that the access point AP1 transmits radio waves in accordance with the transmission parameters determined in FIG. 6. The regions shown as shaded portions indicate the radio waves transmitted from the access point AP1.

The access point AP1 transmits directional radio waves (beams) to the wireless terminals STA1 and STA3 using the first and second channels ch1 and ch2 and with a transmission bandwidth of 40 MHz, and transmits frames at the same time by performing spatial multiplexing.

Thereby, the access point AP1 can use the channels ch1 and ch2, which are idle in the space area $S_{STA1}$ in which the destination terminals (the wireless terminals STA1 and STA3) are located, to transmit frames even if the second channel ch2 in the space area $S_{STA2}$ is busy, and it is possible to increase the transmission bandwidth to 40 MHz and improve the practical throughput.

The access point AP1 can easily acquire the channel transmission right because it can use channels which are idle in the space area in which a destination terminal is located to transmit frames even if the busy/idle states of the space areas other than the space area in which the destination terminal is located are "busy". Therefore, it is possible to realize broadbanding of the transmission channels, suppress increase in the waiting time before starting transmission of wireless signals, and improve the practical throughput.

Furthermore, since the access point AP1 transmits directional radio waves to the wireless terminals STA1 and STA3 located in space areas recognized to be idle, according to the busy/idle state of each channel in each space area, it is possible suppress interference with radio waves transmitted and received in the OBSS.

Example 2

Next, description will be made on the operation of the transmission parameter determining section 70 determining transmission parameters performed when the access point AP1 transmits frames to the wireless terminal STA2, with the use of FIG. 6.

First, since the second channel ch2 is busy though the first channel ch1 is idle, in the space area $S_{STA2}$ in which, the destination terminal (the wireless terminal STA2) is located, the transmission parameter determining section 70 sets 20 MHz as the transmission bandwidth and determines the first channel ch1 as the transmission channel (step S101).

Next, since the other space areas ($S_{STA1}$ and $S_{STA3}$) are idle in the transmission channel (the first channel ch1) determined at step S101, the transmission parameter determining section 70 determines to perform nondirectional transmission of radio waves (step S102).

Next, the transmission parameter determining section 70 determines not to perform spatial multiplexing (step S103). The transmission parameter determining section 70 may determine to perform spatial multiplexing at step S103 and perform directional transmission of radio waves even if it has determined not to perform nondirectional transmission of radio waves at step S102.

In this way, the transmission parameter determining section 70 determines transmission parameters used to transmit inputted frames, according to the busy/idle state of each channel in each space area.

The beam control section 80 uses the first channel ch1 to form beams for performing nondirectional transmission of radio waves (beams).

Figure 8:
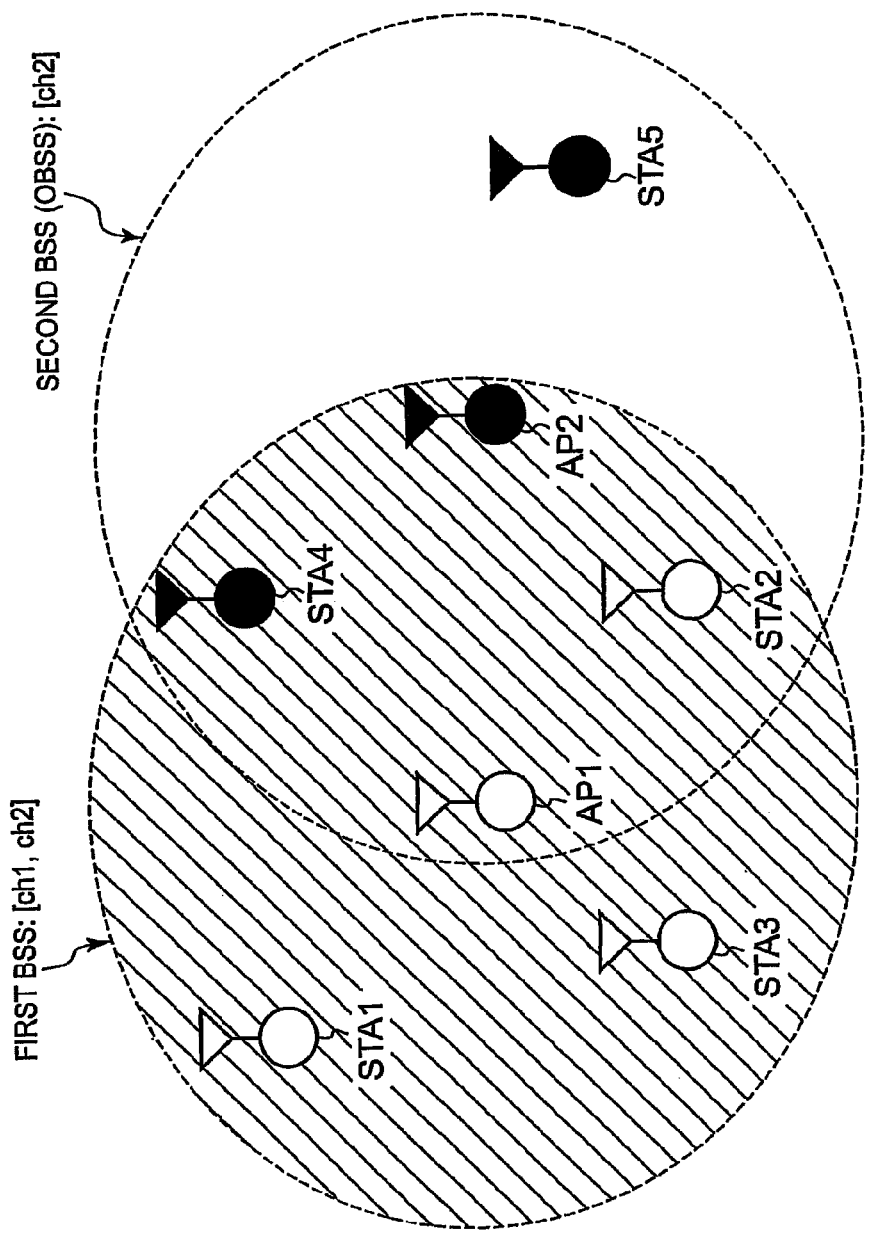
FIG. 8 is a schematic diagram showing radio waves transmitted from the access point according to the first embodiment of the present invention.

FIG. 8 is a schematic diagram showing that the access point AP1 transmits radio waves in accordance with the transmission parameters determined in FIG. 6. The regions shown as shaded portions indicate the radio waves transmitted from the access point AP1.

The access point AP1 transmits nondirectional radio waves (beams) to the wireless terminal STA2 using the first channel ch1 and with a transmission bandwidth of 20 MHz.

Thereby, even if the second channel ch2 in the space area $S_{STA2}$ is busy, and wireless communication using the second channel ch2 is performed in the OBSS (the second BSS), the access point AP1 can transmit frames to the space area $S_{STA2}$ in which the destination terminal (the wireless terminal STA2) is located using only the first channel ch1 which is not used in the OBSS, and it is possible to suppress interference with radio waves transmitted and received in the OBSS.

The access point AP1 transmits radio waves using only the first channel ch1 which is not used in the OBSS. However, it transmits nondirectional radio waves, and therefore, the practical throughput can be improved in comparison with the case of transmitting directional radio waves.

Even if wireless communication using the first channel ch1 is performed in the OBSS (the second BSS), it is possible to suppress interference with radio waves transmitted and received in the OBSS because the access point AP1 transmits radio waves according to the busy/idle state of each channel in each space area.

In the first embodiment, the space division processing section 40 is assumed to identify the direction from which radio waves received by the antenna 10 have come or the sector in which radio waves have been received by a sector antenna. However, the space division processing section 40 may be assumed to identify the position of the OBSS.

In this case, the space division processing section 40 of the access point AP1 receives position information (for example, an annunciation signal) about the access point AP2 and the wireless terminals STA4 and STA5 which belong to the second BSS, from the access point AP2 of the second BSS (OBSS), and identifies the direction in which they exist (or the sector number) as the position (space area) of the second BSS.

In the case of receiving a radio wave (for example, an annunciation signal) from the access point AP2 of the second BSS (OBSS), the space division processing section 40 of the access point AP1 may identify the direction from which the radio wave has come (or the sector number) as the position of the second BSS, or may identify the region with the direction from which the radio wave has come (or the sector number) as the center, as the position of the second BSS.

In this way, when the existence of the OBSS is confirmed, the space division processing section 40 of the access point AP1 identifies the position (space area) of the OBSS, and the carrier sense section 50 judges the busy/idle state of the position of the OBSS, and thereby, occurrence of interference (conflict) with communication in the OBSS can be suppressed.

This access point AP1 can be realized, for example, by using a general-purpose computer apparatus as basic hardware. That is, the frequency division processing section 30, the space division processing section 40, the carrier sense section 50, the transmission parameter determining section 70 and the beam control section 80 can be realized by causing a processor mounted on the computer apparatus to execute a program. In this case, the access point AP1 may be realized by installing the program in the computer apparatus in advance, or may be realized by storing the program in a recording medium such as a CD-ROM or distributing the program via a network, and appropriately installing the program in the computer apparatus. The channel state storage section 60 and the transmission queue can be realized by appropriately using a memory or a hard disk internally or externally attached to the computer apparatus or a recording medium such as a CD-R, CD-RW, DVD-RAM and DVD-R.

Second Embodiment

In the first embodiment, an example has been described in which two BSS's are overlapped. In the second embodiment, an example will be described in which three BSS's are overlapped. Description of the portions common to the wireless system according to this second embodiment and the wireless system according to the first embodiment will be omitted.

Figure 9:
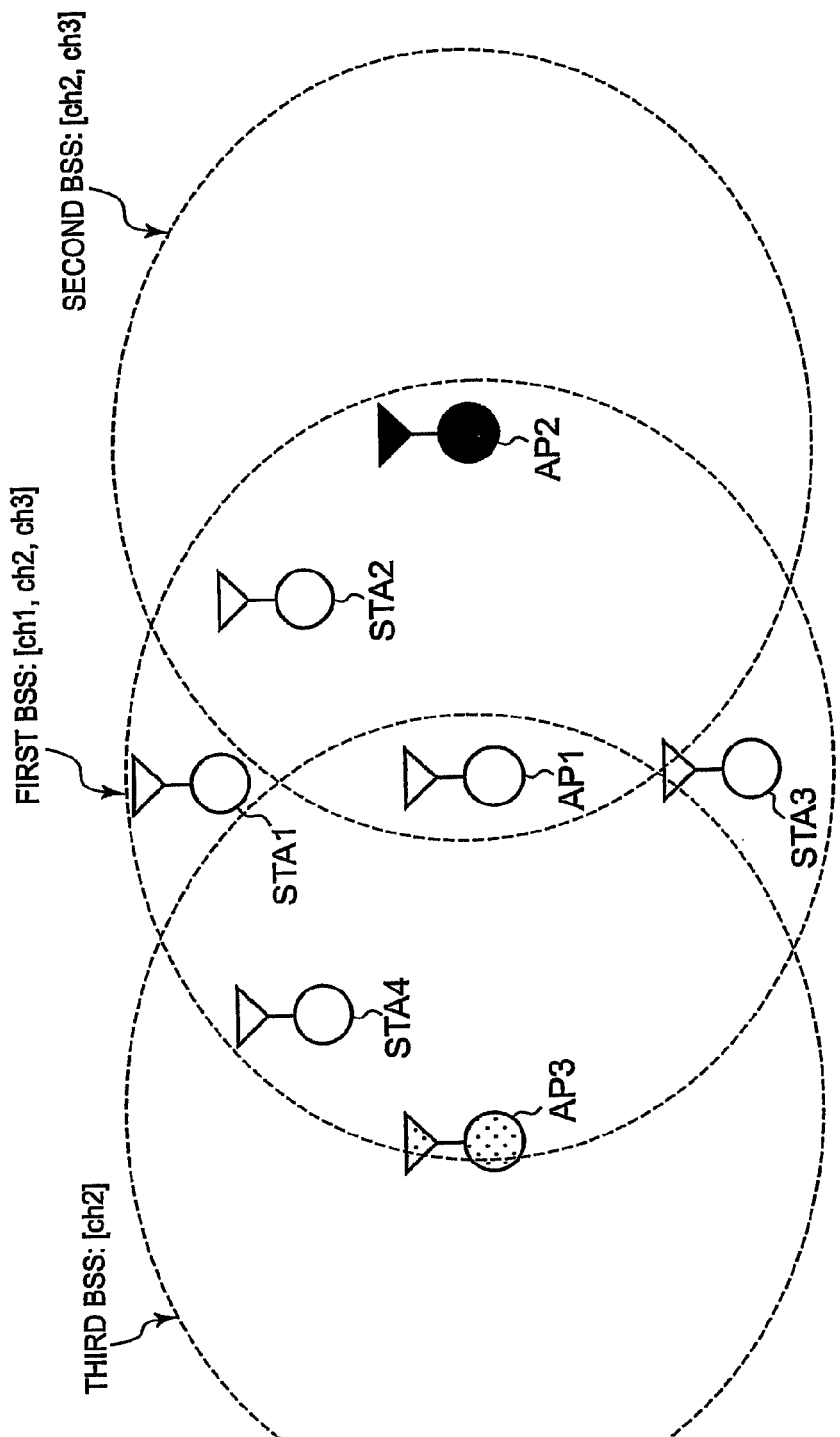
FIG. 9 is a block diagram showing a wireless system according to a second embodiment of the present invention.

FIG. 9 is a diagram showing a wireless system according to the second embodiment. An access point AP1 and wireless terminals STA1 to STA3 which belong to a first BSS are shown by marks in white; an access point AP2 which belongs to a second BSS is shown by a mark in black; and an access point AP3 which belongs to a third BSS is shown by a mark in gray (dot pattern).

The wireless system according to the second embodiment is provided with the first BSS, the second BSS and the third BSS. The first BSS and the second BSS adjoin each other. The first BSS and the third BSS adjoin each other. The second and third BSS's are OBSS's for the first BSS.

The first BSS is formed by one access point AP1 and four wireless terminals STA1 to STA4. The access point AP1 intensively manages the first BSS.

The access point AP1 and the wireless terminals STA1 to STA4 which belong to the first BSS perform transmission/receiving of frames using one of a first channel ch1, a second channel ch2 and a third channel ch3 or using two or three of the channels at the same time. The access point AP1 performs transmission of directional radio waves and transmission of nondirectional radio waves.

The second BSS is formed by one access point AP2. The access point AP2 intensively manages the second BSS. The access point AP2 which belongs to the second BSS performs transmission/receiving of frames using one of the second channel ch2 and the third channel ch3 or using the two channels at the same time.

The third BSS is formed by one access point AP3. The access point AP3 intensively manages the third BSS. The access point AP3 which belongs to the third BSS performs transmission/receiving of frames using the second channel ch2.

The first BSS and the second BSS are overlapped with each other in the first channel ch1 and the second channel ch2. Therefore, the access point AP1 and the wireless terminals STA1 to STA4 which belong to the first BSS, and the access point AP2 which belongs to the second BSS share the same channels (the second channel ch2 and the third channel ch3).

The first BSS and the third BSS are overlapped with each other in the second channel ch2. Therefore, the access point AP1 and the wireless terminals STA1 to STA4 which belong to the first BSS, and the access point AP3 which belongs to the third BSS share the same channel (the second channel ch2).

Figure 10:
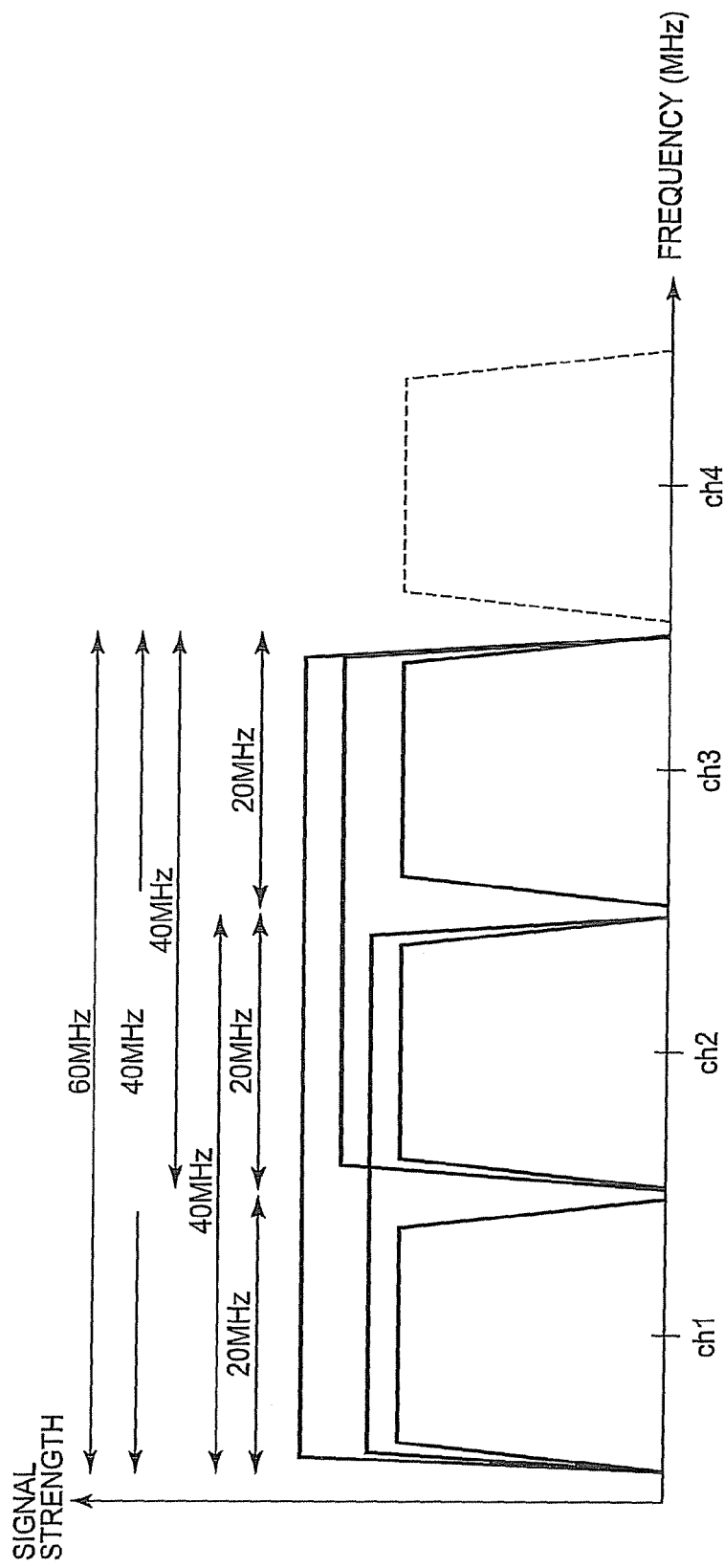
FIG. 10 is a diagram showing an example of use of the channels according to the second embodiment of the present invention.

FIG. 10 is a schematic diagram showing the channels used by the first BSS.

In the first BSS, wireless communication with a bandwidth of 20 MHz may be performed with the use of any of the first channel ch1 to the third channel ch3 between AP and STA or between STA and STA. Wireless communication with a bandwidth of 40 MHz may be performed with the use of two of the first channel ch1 to the third channel ch3. Wireless communication with a bandwidth of 60 MHz may be performed by using all of the first channel ch1 to the third channel ch3 at the same time.

In the second BSS, wireless communication with a bandwidth of 20 MHz may be performed with the use of only one of the second channel ch2 and the third channel ch3 between AP and STA or between STA and STA. Wireless communication with a bandwidth of 40 MHz may be performed by using the second channel ch2 and the third channel ch3 at the same time.

In the third BSS, wireless communication with a bandwidth of 20 MHz is performed with the use of the second channel ch2 between AP and STA or between STA and STA.

As shown in FIG. 4, the configuration of the access point AP1 according to the second embodiment is similar to the configuration of the access point AP1 according to the first embodiment.

The access point AP1 according to the second embodiment has an antenna 10, a receiving RF section 20, a frequency division processing section 30, a space division processing section 40, a carrier sense section 50, a channel state storage section 60, a transmission parameter determining section 70, a beam control section 80, and a transmission RF section 90.

FIG. 11 is a diagram showing an example of the contents stored in a channel state storage section 60 of the access point AP1 according to the second embodiment.

The channel state storage section 60 stores the idle/busy state of each channel in each space area. The space areas $S_{STA1}$, $S_{STA2}$, $S_{STA3}$ and $S_{STA4}$ are space areas in which the wireless terminals STA1 to STA4 which belong to the same first BSS as the access point AP1 are located. The channels ch1, ch2 and ch3 are the first to third channels ch1 to ch3 used by the access point AP1 for wireless communication.

FIG. 11 shows that, as for the directions in which the wireless terminals STA1 and STA3 are located (the space areas $S_{STA1}$ and $S_{STA3}$), all of the first to third channels ch1 to ch3 are idle. FIG. 11 shows that, as for the direction in which the wireless terminal STA2 is located (the space area $S_{STA2}$), the first channel ch1 is idle, and the second and third channels ch2 and ch3 are busy. FIG. 11 shows that, as for the direction in which the wireless terminal STA4 is located (the space area $S_{STA4}$), the first and third channels ch1 and ch3 are idle and the second channel ch2 is busy.

Example 1

Next, description will be made on the operation of the transmission parameter determining section 70 determining transmission parameters performed when the access point AP1 transmits frames to the wireless terminal STA1, with the use of FIG. 6.

First, since all of the first to third channels ch1 to ch3 are idle in the space area $S_{STA1}$ in which the destination terminal (the wireless terminal STA1) is located, the transmission parameter determining section 70 sets 60 MHz as the transmission bandwidth and determines the first to third channels ch1 to ch3 as the transmission channels (step S101).

Next, since, among the transmission channels (the first to third channels ch1 to ch3) determined at step S101, the second channel ch2 is busy in the space areas $S_{STA2}$ and $S_{STA3}$, and the third channel ch3 is busy in the space area $S_{STA2}$, the transmission parameter determining section 70 determines to perform directional transmission of radio waves (step S102).

Next, the transmission parameter determining section 70 determines to perform spatial multiplexing (step S103).

Next, the transmission parameter determining section 70 determines to perform spatial multiplexing, for the wireless terminal STA1 and the wireless terminal STA3 (step S104).

In this way, the transmission parameter determining section 70 determines transmission parameters used to transmit inputted frames, according to the busy/idle state of each channel in each space area.

The beam control section 80 uses all of the first to third channels ch1 to ch3 to form beams so that the directivity of radio waves is oriented to the wireless terminals STA1 and STA3. The beam control section 80 may form the beams so that null is oriented to the space areas $S_{STA2}$ and $S_{STA4}$ when directional transmission of the beams is performed to the space areas $S_{STA2}$ and $S_{STA3}$ via the first to third channels ch1 to ch3.

Figure 12:
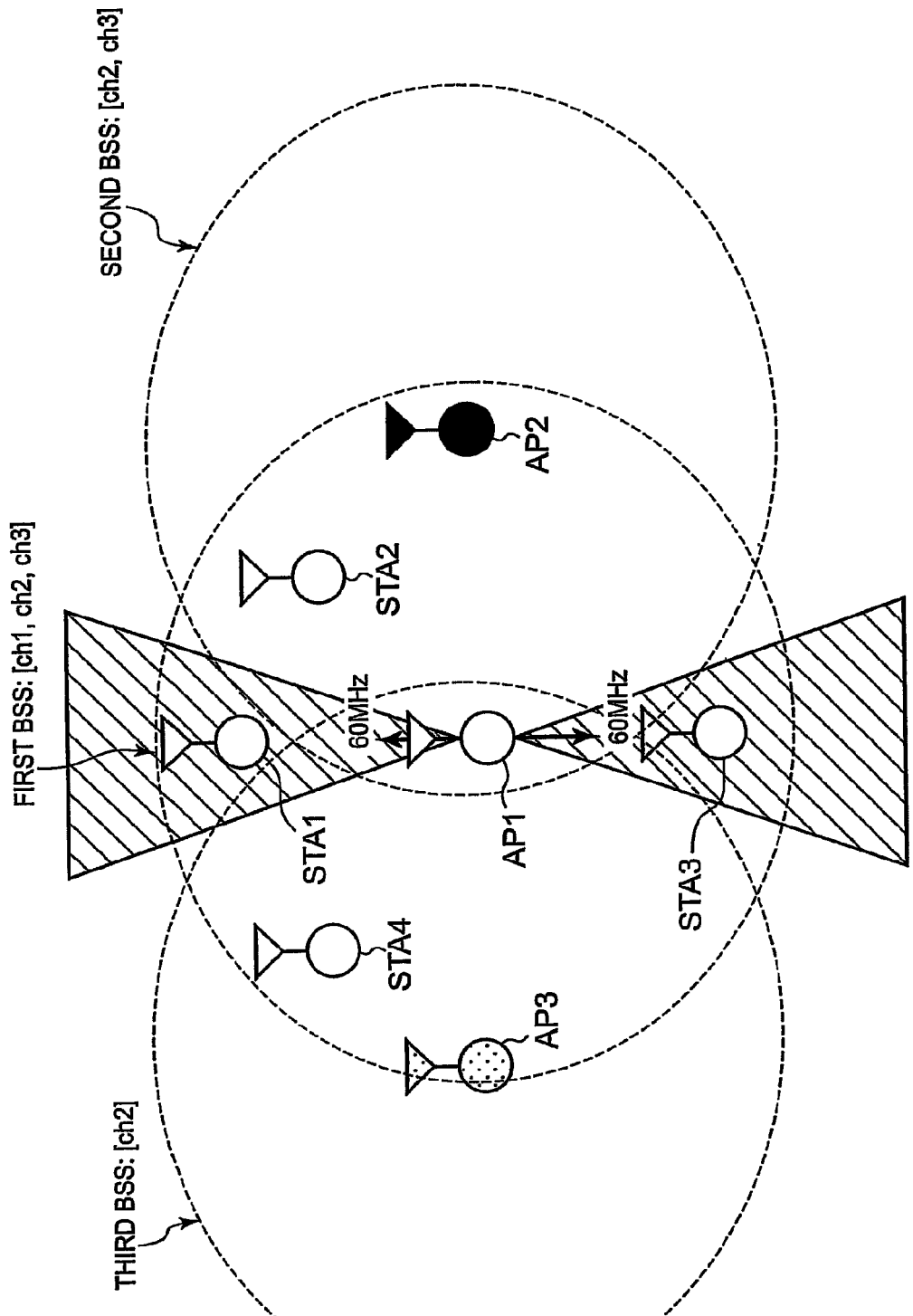
FIG. 12 is a schematic diagram showing radio waves transmitted from an access point according to the second embodiment of the present invention.

FIG. 12 is a diagram showing that the access point AP1 transmits radio waves in accordance with the transmission parameters determined in FIG. 6. The regions shown as shaded portions indicate the radio waves transmitted from the access point AP1.

The access point AP1 transmits directional radio waves (beams) to the wireless terminals STA1 and STA3 using the first to third channels ch1 to ch3 and with a transmission band width of 60 MHz.

Thereby, the access point AP1 can use all of the channels ch1 to ch3, which are idle in the space areas $S_{STA1}$ and $S_{STA3}$ in which the destination terminals (the wireless terminals STA1 and STA3) are located, to transmit frames even if the second and third channels ch2 and ch3 in the space area $S_{STA2}$ and the second channel ch2 in the space area $S_{STA4}$ are busy, and it is possible to increase the transmission bandwidth to 60 MHz and improve the practical throughput.

The access point AP1 can easily acquire the channel transmission right because it can use channels which are idle in the space area in which a destination terminal is located to transmit frames even if the busy/idle states of the space areas other than the space area in which the destination terminal is located are "busy". Therefore, it is possible to realize broadbanding of the transmission channels, suppress increase in the waiting time before starting transmission of wireless signals, and improve the practical throughput.

Furthermore, since the access point AP1 transmits directional radio waves to the wireless terminals STA1 and STA3 located in space areas recognized to be idle, according to the busy/idle state of each channel in each space area, it is possible suppress interference with radio waves transmitted and received in the OBSS's.

Example 2

Next, description will be made on the operation of the transmission parameter determining section 70 determining transmission parameters performed when the access point AP1 transmits frames to the wireless terminal STA2, with the use of FIG. 6.

First, since the second and third channels ch2 and ch3 are busy though the first channel ch1 is idle, in the space area $S_{STA2}$ in which the destination terminal (the wireless terminal STA2) is located, the transmission parameter determining section 70 sets 20 MHz as the transmission bandwidth and determines the first channel ch1 as the transmission channel (step S101).

Next, since the other space areas ($S_{STA1}$, $S_{STA3}$ and $S_{STA4}$) are idle in the transmission channel (the first channel ch1) determined at step S101, the transmission parameter determining section 70 determines to perform nondirectional transmission of radio waves (step S102).

Next, the transmission parameter determining section 70 determines to perform spatial multiplexing (step S103). If determining to perform spatial multiplexing at step S103 though having determined not to perform nondirectional transmission of radio waves at step S102, the transmission parameter determining section 70 re-determines to perform directional transmission because it has determined to perform directional transmission of radio waves.

Next, the transmission parameter determining section 70 selects a wireless terminal for which spatial multiplexing is to be performed (step S104).

The transmission parameter determining section 70 determines to perform spatial multiplexing for the wireless terminal STA4 for which the transmission bandwidth must be determined to be 40 MHz or 20 MHz because the second channel ch2 is busy similarly to the wireless terminal STA2.

In this way, the transmission parameter determining section 70 determines transmission parameters used to transmit inputted frames, according to the busy/idle state of each channel in each space area.

The beam control section 80 uses the first channel ch1 to form beams in a manner the directivity of radio waves is oriented to the wireless terminals STA2 and STA4. The beam control section 80 may form the beams so that null is oriented to the space areas $S_{STA1}$ and $S_{STA3}$ when directional transmission of the beams is performed to the space areas $S_{STA2}$ and $S_{STA4}$ via the first channel ch1.

Figure 13:
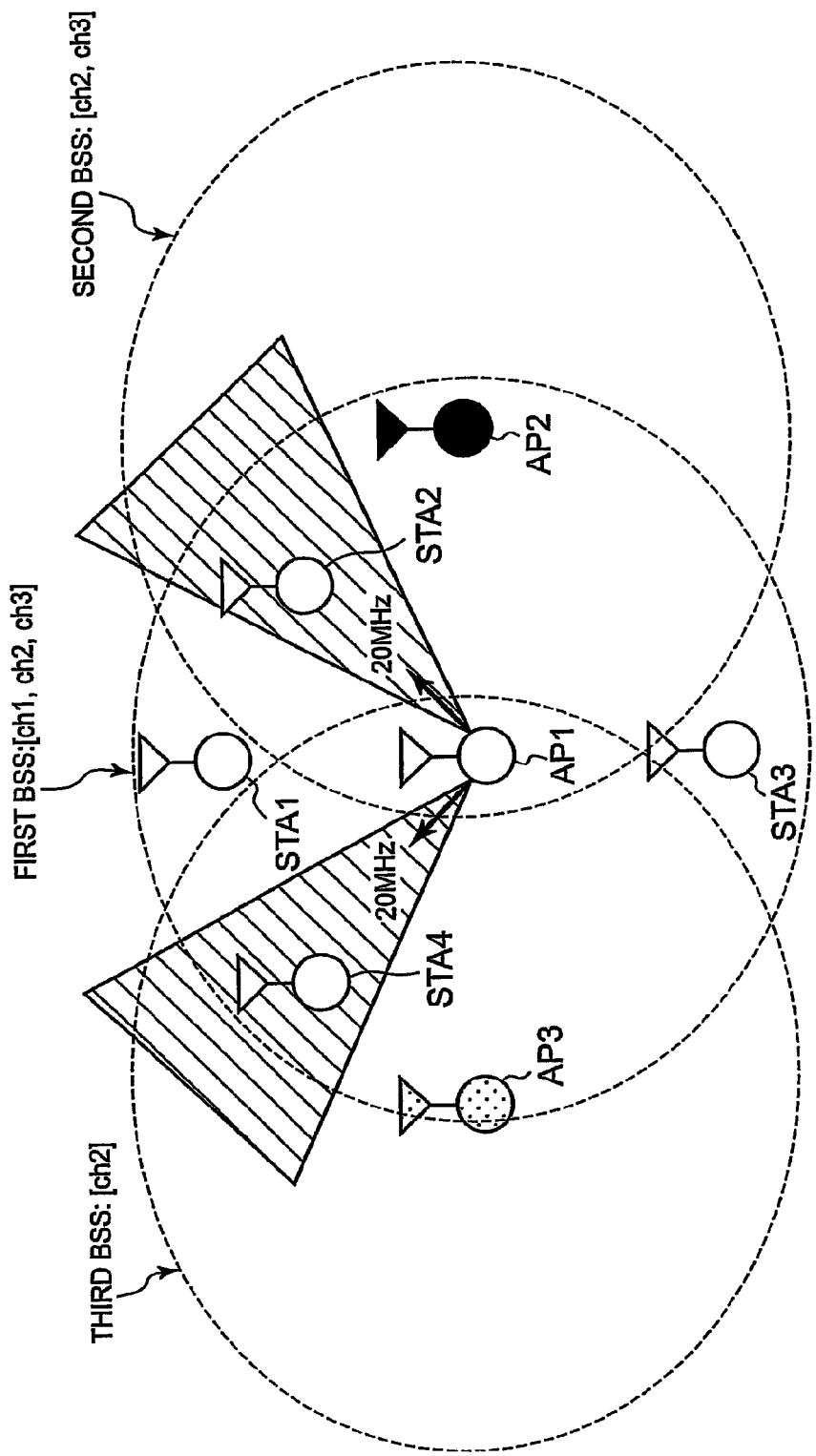
FIG. 13 is a schematic diagram showing radio waves transmitted from the access point according to the second embodiment of the present invention.

FIG. 13 is a diagram showing that the access point AP1 transmits radio waves in accordance with the transmission parameters determined in FIG. 6. The regions shown as shaded portions indicate the radio waves transmitted from the access point AP1.

The access point AP1 transmits directional radio waves (beams) to the wireless terminals STA2 and STA4 using the first channel ch1 and with a transmission bandwidth of 20 MHz.

Thereby, even if wireless communication using the second and third channels ch2 and ch3 in the OBSS (the second BSS) or wireless communication using the second and third channels ch2 and ch3 in the OBSS (the third BSS) is performed, the access point AP1 transmits frames to the space areas $S_{STA2}$ and $S_{STA4}$ in which the destination terminals (the wireless terminals STA2 and STA4) are located, using only the first channel ch1 which is not used in the OBSS's. Thereby, it is possible to suppress interference with radio waves transmitted and received in the OBSS's.

Furthermore, even if wireless communication using the first channel ch1 is performed in the OBSS's (the second and third BSS's), it is possible to suppress interference with radio waves transmitted and received in the OBSS's because the access point AP1 transmits radio waves according to the busy/idle state of each channel in each space area.

The present invention is not limited to the above embodiments as they are. At the stage of practicing the present invention, the components can be changed and embodied within the range not departing from the spirit of the present invention. Furthermore, by appropriately combining the multiple components disclosed in the above embodiments, various inventions can be formed. For example, some components may be deleted from all the components shown in the embodiments. Furthermore, the components in the different embodiments may be appropriately combined.

The invention claimed is:

1. A wireless communication apparatus comprising:
a first identifying unit that identifies a space area from which a radio wave has come;
a second identifying unit that identifies a frequency channel through which the radio wave has been carried;
a judging unit that judges a busy/idle state of the frequency channel identified by the second identifying unit in the space area identified by the first identifying unit;
a storage unit that stores the busy/idle state judged by the judging unit in association with the space area and the frequency channel;
a determining unit that determines one or more frequency channels to be used for transmission depending upon the busy/idle state of each frequency channel in the space area in which the first wireless communication apparatus is located; and
a transmitting unit that transmits a radio wave through the frequency channels determined by the determining unit,
wherein, when there are multiple frequency channels the busy/idle states of which are idle in the space area to which the radio wave is transmitted, the determining unit determines whether to transmit frames using all of the frequency channels which are idle or transmit the frames using a part of the frequency channels which are idle, wherein the determining unit determines whether to transmit the frames using all of the frequency channels which are idle or transmit the frames using a part of the frequency channels which are idle, according to the type of the application of the frames transmitted to the first wireless communication apparatus.

2. A wireless communication apparatus comprising:
a first identifying unit that identifies a space area from which a radio wave has come;
a second identifying unit that identifies a frequency channel through which the radio wave has been carried;
a judging unit that judges a busy/idle state of the frequency channel identified by the second identifying unit in the space area identified by the first identifying unit;
a storage unit that stores the busy/idle state judged by the judging unit in association with the space area and the frequency channel;
a determining unit that determines one or more frequency channels to be used for transmission depending upon the busy/idle state of each frequency channel in the space area in which the first wireless communication apparatus is located; and
a transmitting unit that transmits a radio wave through the frequency channels determined by the determining unit,
wherein, after determining the frequency channels to be used for transmission, the determining unit determines to transmit frames with using the directional transmission if at least one of the busy/idle states of the space areas in the frequency channel is busy.

3. A wireless communication apparatus comprising:
a first identifying unit that identifies a space area from which a radio wave has come;
a second identifying unit that identifies a frequency channel through which the radio wave has been carried;
a judging unit that judges a busy/idle state of the frequency channel identified by the second identifying unit in the space area identified by the first identifying unit;
a storage unit that stores the busy/idle state judged by the judging unit in association with the space area and the frequency channel;
a determining unit that determines one or more frequency channels to be used for transmission depending upon the busy/idle state of each frequency channel in the space area in which the first wireless communication apparatus is located; and
a transmitting unit that transmits a radio wave through the frequency channels determined by the determining unit,
wherein, after determining the frequency channels to be used for transmission, the determining unit determines whether to transmit frames with using the directional transmission or omni-directional transmission if all of the busy/idle states of the space areas in the frequency channels are "idle".

4. A wireless communication apparatus comprising:
a first identifying unit that identifies a space area from which a radio wave has come;
a second identifying unit that identifies a frequency channel through which the radio wave has been carried;
a judging unit that judges a busy/idle state of the frequency channel identified by the second identifying unit in the space area identified by the first identifying unit;
a storage unit that stores the busy/idle state judged by the judging unit in association with the space area and the frequency channel;
a determining unit that determines one or more frequency channels to be used for transmission depending upon the busy/idle state of each frequency channel in the space area in which the first wireless communication apparatus is located; and
a transmitting unit that transmits a radio wave through the frequency channels determined by the determining unit, wherein, after determining the frequency channels to be used for transmission, the determining unit determines to multiplex at least one of other wireless communication apparatuses located in the space areas the busy/idle states of which are recognized to be idle in the frequency channels.

5. The apparatus according to claim 4, further comprising a beam control unit that performs control so that the directivity of a radio wave is oriented to the space area to which the radio wave is transmitted or the other wireless communication apparatus determined to be multiplexed by the determining unit.

6. The apparatus according to claim 5, wherein the beam control unit controls the directivity of a radio wave so that null is oriented to a space area the busy/idle state of which is recognized to be "busy" in the frequency channels to be used for transmission.

7. A wireless communication apparatus comprising:
a first identifying unit that identifies a space area from which a radio wave has come;
a second identifying unit that identifies a frequency channel through which the radio wave has been carried;
a judging unit that judges a busy/idle state of the frequency channel identified by the second identifying unit in the space area identified by the first identifying unit;
a storage unit that stores the busy/idle state judged by the judging unit in association with the space area and the frequency channel;
a determining unit that determines one or more frequency channels to be used for transmission depending upon the busy/idle state of each frequency channel in the space area in which the first wireless communication apparatus is located; and
a transmitting unit that transmits a radio wave through the frequency channels determined by the determining unit, wherein
some of the space areas are regions where other networks adjacent to a network to which the wireless communication apparatus belongs are located; and
the first identifying unit estimates the respective space areas in which the other networks are located by an announcement signal received from the other wireless communication apparatuses which belong to the other network.

8. A wireless communication apparatus comprising:
a first identifying unit that identifies a space area from which a radio wave has come;
a second identifying unit that identifies a frequency channel through which the radio wave has been carried;
a judging unit that judges a busy/idle state of the frequency channel identified by the second identifying unit in the space area identified by the first identifying unit;
a storage unit that stores the busy/idle state judged by the judging unit in association with the space area and the frequency channel;
a determining unit that determines one or more frequency channels to be used for transmission depending upon the busy/idle state of each frequency channel in the space area in which the first wireless communication apparatus is located; and
a transmitting unit that transmits a radio wave through the frequency channels determined by the determining unit, wherein
the wireless communication apparatus and the second wireless communication apparatus belong to the same network;
information showing a state indicating whether the second wireless communication apparatus is busy or idle is received from the second wireless communication apparatus; and
the judging unit judges the busy/idle state of the space area in which the second wireless communication apparatus is located according to the information.

9. A wireless communication apparatus comprising:
a first identifying unit that identifies a space area from which a radio wave has come;
a second identifying unit that identifies a frequency channel through which the radio wave has been carried;
a judging unit that judges a busy/idle state of the frequency channel identified by the second identifying unit in the space area identified by the first identifying unit;
a storage unit that stores the busy/idle state judged by the judging unit in association with the space area and the frequency channel;
a determining unit that determines one or more frequency channels to be used for transmission depending upon the busy/idle state of each frequency channel in the space area in which the first wireless communication apparatus is located; and
a transmitting unit that transmits a radio wave through the frequency channels determined by the determining unit, wherein
the transmitting unit transmits a signal to the first wireless communication apparatus using multiple frequency channels; and
when receiving a response frame to the signal is received, the judging unit judges the busy/idle state of the frequency channel through which the response frame has been transmitted in the space area in which the first wireless communication apparatus is located, to be "idle".

* * * * *